United States Patent
Matsubara et al.

(10) Patent No.: US 11,646,446 B2
(45) Date of Patent: May 9, 2023

(54) RECHARGEABLE BATTERY AND ELECTROLYTE SOLUTION

(71) Applicant: Panasonic Intellectual Property Management Co., Ltd., Osaka (JP)

(72) Inventors: Kenji Matsubara, Osaka (JP); Nobuhiko Hojo, Osaka (JP); Hiroyuki Matsumoto, Osaka (JP); Takayuki Nakatsutsumi, Osaka (JP); Kazuhiro Iida, Osaka (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 16/961,007

(22) PCT Filed: Nov. 30, 2018

(86) PCT No.: PCT/JP2018/044135
§ 371 (c)(1),
(2) Date: Jul. 9, 2020

(87) PCT Pub. No.: WO2019/138724
PCT Pub. Date: Jul. 18, 2019

(65) Prior Publication Data
US 2021/0083324 A1    Mar. 18, 2021

(30) Foreign Application Priority Data
Jan. 15, 2018   (JP) .............................. JP2018-003922

(51) Int. Cl.
*H01M 4/00*     (2006.01)
*H01M 10/0566*  (2010.01)
(Continued)

(52) U.S. Cl.
CPC ....... *H01M 10/0566* (2013.01); *H01M 4/485* (2013.01); *H01M 4/661* (2013.01);
(Continued)

(58) Field of Classification Search
CPC ....... Y02E 60/10; H01M 10/26; H01M 4/661; H01M 4/485; H01M 10/0566
See application file for complete search history.

(56) References Cited

U.S. PATENT DOCUMENTS 6,489,055 B1     12/2002  Ichihashi et al.
6,824,920 B1 *   11/2004  Iwamoto ................. H01M 4/38
                                                        429/231.95
(Continued)

FOREIGN PATENT DOCUMENTS

CN     110383564 A      10/2019
JP     2001-068154 A    3/2001
(Continued)

OTHER PUBLICATIONS

International Search Report dated Jan. 29, 2019, issued in Application No. PCT/JP2018/044135 (2 pages).
(Continued)

*Primary Examiner* — Cynthia H Kelly
*Assistant Examiner* — Monique M Wills
(74) *Attorney, Agent, or Firm* — WHDA, LLP

(57) ABSTRACT

A rechargeable battery including a positive electrode, a negative electrode, and an electrolyte solution is provided. The electrolyte solution contains water and one or more lithium salts, and the lithium salts include lithium fluorophosphate.

8 Claims, 1 Drawing Sheet

(51) Int. Cl.
*H01M 4/485* (2010.01)
*H01M 4/66* (2006.01)
*H01M 10/0525* (2010.01)
*H01M 10/26* (2006.01)

(52) U.S. Cl.
CPC ....... *H01M 10/0525* (2013.01); *H01M 10/26* (2013.01); *H01M 2300/0002* (2013.01)

(56) References Cited

U.S. PATENT DOCUMENTS

| | | | |
|---|---|---|---|
| 2012/0140378 A1* | 6/2012 | Tan | H01M 12/08 429/491 |
| 2016/0118649 A1* | 4/2016 | Yamamoto | H01M 4/525 429/188 |
| 2017/0187070 A1* | 6/2017 | Park | H01M 4/485 |
| 2017/0275310 A1* | 9/2017 | Okada | C07C 19/08 |
| 2017/0373351 A1 | 12/2017 | Kawai et al. | |
| 2019/0393556 A1 | 12/2019 | Matsuoka et al. | |

FOREIGN PATENT DOCUMENTS

| | | |
|---|---|---|
| JP | 2010-153337 A | 7/2010 |
| JP | 2016-178125 A | 10/2016 |
| JP | 2017-212153 A | 11/2017 |
| WO | 2016/114141 A1 | 7/2016 |
| WO | 2018/169028 A1 | 9/2018 |

OTHER PUBLICATIONS

English Translation of Chinese Search Report dated Feb. 8, 2023, issued in counterpart CN application No. 201880085822.0. (3 pages).

* cited by examiner

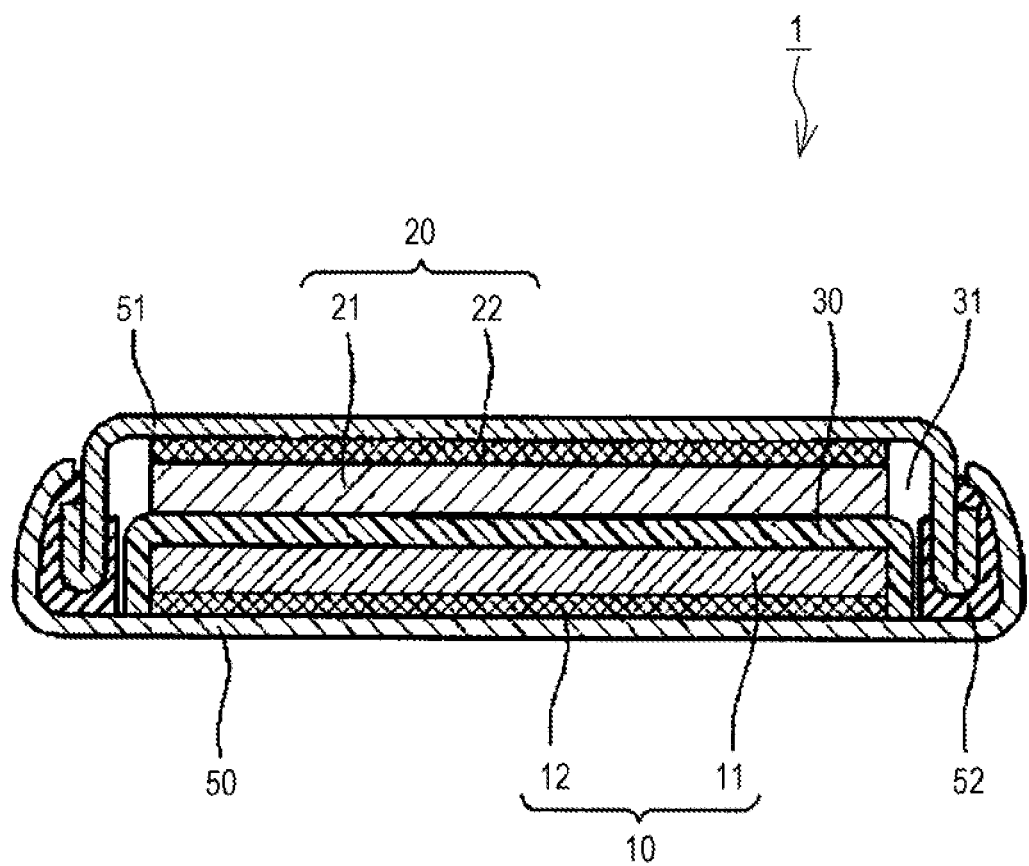

RECHARGEABLE BATTERY AND ELECTROLYTE SOLUTION

TECHNICAL FIELD

The present disclosure relates to improved coulombic efficiency of a rechargeable battery.

BACKGROUND ART

PTL 1 discloses a secondary battery that operates, by using an electrolyte solution containing a high concentration of alkali metal salts, at a higher voltage of 2 V than conventional secondary batteries.

CITATION LIST

Patent Literature

PTL 1: International Publication No. 2016/114141

SUMMARY OF INVENTION

The secondary battery containing alkali metal salts of PTL 1 is disclosed to allow reversible charge/discharge operation, in particular, under application of a high voltage of 2 V or more. However, there is a problem in which the coulombic efficiency is low.

A rechargeable battery according to the present disclosure includes a positive electrode, a negative electrode, and an electrolyte solution. The electrolyte solution contains water and one or more lithium salts, and the lithium salts include lithium fluorophosphate.

An electrolyte solution according to the present disclosure contains water and one or more lithium salts, and the lithium salts include lithium fluorophosphate.

According to the rechargeable battery of the present disclosure, it is possible to enhance the coulombic efficiency under application of a voltage of 2 V or more.

BRIEF DESCRIPTION OF DRAWING

FIG. 1 is a schematic cross-sectional view of a rechargeable battery according to an embodiment.

DESCRIPTION OF EMBODIMENTS

An electrolyte solution of the present disclosure contains water as a solvent and is added with lithium fluorophosphate. In the present embodiments hereinafter, a rechargeable battery is referred to as an aqueous rechargeable battery, whereas an electrolyte solution is referred to as an aqueous electrolyte solution in some cases. By incorporating lithium fluorophosphate into an aqueous electrolyte solution, a negative electrode coating derived from lithium fluorophosphate is presumably formed, at a voltage lower than the voltage at which water undergoes reductive decomposition, on at least any site of a negative electrode current collector surface, a negative electrode active material surface, and a negative electrode conductive agent surface. By such negative electrode coatings, reductive decomposition of water on the negative electrode current collector surface, the negative electrode active material surface, and the negative electrode conductive agent surface is considered to be suppressed, thereby improving coulombic efficiency.

Lithium fluorophosphate has been reported as an additive for an electrolyte solution of a nonaqueous electrolyte rechargeable battery. In such a nonaqueous electrolyte solution, however, it is common technical knowledge to eliminate water as much as possible, for example, to the extent of several tens ppm or less. In the present disclosure, by incorporating lithium fluorophosphate into an electrolyte solution of an aqueous rechargeable battery that contains a large amount of water as a solvent, unconventional unique effects are presumably exhibited. In other words, the formation of a negative electrode coating through reductive decomposition of lithium fluorophosphate, hydrolysis of lithium fluorophosphate, and further, the formation of a negative electrode coating through reductive decomposition of lithium fluorophosphate hydrolysate are considered to occur simultaneously to form negative electrode coatings that are particularly excellent in water resistance and stability.

Hereinafter, an exemplary aqueous rechargeable battery of the present embodiment will be described in detail by means of the drawing. FIG. 1 illustrates the schematic cross-section of a coin cell 1 of an embodiment of the present disclosure. The coin cell 1 has a structure whose inside is sealed with a coin cell case 50, a seal 51, and a gasket 52. Inside the coin cell 1, a positive electrode 10 including a positive electrode active material layer 11 and a positive electrode current collector 12; a negative electrode 20 including a negative electrode active material layer 21 and a negative electrode current collector 22; and a separator 30 are placed. The positive electrode 10 and the negative electrode 20 face each other via the separator 30. The positive electrode active material layer 11 and the negative electrode active material layer 21 are arranged to come into contact with the separator 30. An electrode assembly composed of the positive electrode 10, the negative electrode 20, and the separator 30 is impregnated with an electrolyte solution 31.

Here, an exemplary coin cell is illustrated in FIG. 1. However, the aqueous rechargeable battery of the present disclosure may be in any form, such as cylindrical-, prismatic-, button-, or laminate-type.

(Aqueous Electrolyte Solution)

The aqueous electrolyte solution may be added with lithium fluorophosphate to suppress decomposition of water as a solvent. Lithium fluorophosphate is $Li_xPF_yO_z$ ($1 \leq x < 3$, $0 < y \leq 2$, $2 \leq z < 4$), for example, and is preferably $LiPF_2O_2$, $Li_2PFO_3$, or the like. In particular, $LiPF_2O_2$ is suitably used. When $LiPF_2O_2$, $Li_2PFO_3$, and/or $Li_3PO_4$ are present as a mixture in the general formula $Li_xPF_yO_z$, x ($1 \leq x < 3$), y ($0 < y \leq 2$), and z ($2 \leq z < 4$) may be any numerical value.

Lithium fluorophosphate is contained in the aqueous electrolyte solution at preferably 0.1% by mass or more and more preferably 0.5% by mass or more. Meanwhile, lithium fluorophosphate is contained in the aqueous electrolyte solution at preferably 5.0% by mass or less and more preferably 3.0% by mass or less.

Lithium fluorophosphate undergoes reductive decomposition prior to decomposition of water on a negative electrode current collector surface, a negative electrode active material surface, and a negative electrode conductive agent surface. Composite coatings (negative electrode coatings) containing fluorine, lithium, phosphorus, oxygen, and protons resulting from the decomposition of lithium fluorophosphate are presumably formed on the negative electrode current collector surface, the negative electrode active material surface, and the negative electrode conductive agent surface. The direct contact area with water of the negative electrode current collector surface, the negative electrode active material surface, and the negative electrode conductive agent surface is considered to be reduced by such composite coatings while suppressing decomposition of water, thereby improving initial coulombic efficiency and so forth.

It is noted that lithium salts that have been used for nonaqueous electrolyte solutions are unsuitable for aqueous electrolyte solutions in some cases. Exemplary lithium salts unsuitable for aqueous electrolyte solutions include $LiPF_6$. $LiPF_6$ reacts with water to generate HF. HF that is present in an electrolyte solution causes dissolution of transition metals and thus impairs cycle characteristics.

In addition to lithium fluorophosphate, $Li_3PO_4$ and/or a carboxylic anhydride may be added to the aqueous electrolyte solution. Exemplary carboxylic anhydrides include cyclic carboxylic anhydrides and acyclic carboxylic anhydrides. Examples of the cyclic carboxylic anhydrides include succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride. These cyclic carboxylic anhydrides and acyclic carboxylic anhydrides may be used in combination.

By adding $Li_3PO_4$ and/or a carboxylic anhydride to the aqueous electrolyte solution, durability of a negative electrode is further improved.

$Li_3PO_4$ and a carboxylic anhydride are preferably contained in the aqueous electrolyte solution at 0.1% by mass or more and 5.0% by mass or less in total with the amount of lithium fluorophosphate added.

An acid or an alkali may also be added to control the pH of the aqueous electrolyte solution. As an acid, $CF_3SO_3H$ having an imide anion, $HN(SO_2CF_3)_2$, or $HN(SO_2C_2F_5)_2$ may be added. Meanwhile, LiOH may be added as an alkali. To attain a high voltage of 2 V or more of the aqueous rechargeable battery, addition of an alkali or LiOH is effective.

Since solvents for lithium salts include non-flammable water as a primary solvent, it is possible to obtain a safe rechargeable battery. Water is contained in the electrolyte solution at preferably 8% by mass or more and more preferably 10% by mass or more. Meanwhile, water is contained in the electrolyte solution at preferably 50% by mass or less and more preferably 20% by mass or less. A mixed solvent of water as a primary solvent and other nonaqueous solvents may also be used.

The amount of water contained in the electrolyte solution is preferably 4 mol or less relative to 1 mol of lithium salts. Meanwhile, the amount of water contained in the electrolyte solution is preferably 1.5 mol or more relative to 1 mol of lithium salts. This is because such amounts can reduce water activity and expand the potential window of the aqueous electrolyte solution, thereby attaining a high voltage of 2 V or more of the aqueous rechargeable battery.

(Positive Electrode)

The positive electrode includes a sheet-like positive electrode current collector and a positive electrode active material layer provided on the surface of the positive electrode current collector. The positive electrode active material layer may be formed on either surface of the positive electrode current collector or may be formed on both the surfaces.

(Positive Electrode Current Collector)

Examples of the positive electrode current collector include metal foils and metal sheets. As a material for the positive electrode current collector, stainless steel, aluminum, an aluminum alloy, titanium, or the like may be used. The thickness of the positive electrode current collector is 3 to 50 µm, for example.

(Positive Electrode Active Material Layer)

A case in which a positive electrode active material layer is a mixture containing positive electrode active material particles will be described. The positive electrode active material layer contains a positive electrode active material and a binder as essential components and a conductive agent as an optional component. The positive electrode active material layer can be formed by mixing positive electrode active material particles, a binder, and so forth together with a dispersion medium to prepare a positive electrode slurry, applying the positive electrode slurry to the surface of a positive electrode current collector, drying, and then rolling. As the dispersion medium, water; an alcohol, such as ethanol; an ether, such as tetrahydrofuran; N-methyl-2-pyrrolidone (NMP); or the like is used. When water is used as a dispersion medium, it is preferable to use a rubber material and a water-soluble polymer in combination as binders.

The amount of binder contained in the positive electrode active material layer is preferably 0.1% by mass or more and more preferably 1% by mass or more relative to 100% by mass of the positive electrode active material. Meanwhile, the amount of binder contained in the positive electrode active material layer is preferably 20% by mass or less and more preferably 5% by mass or less relative to 100% by mass of the positive electrode active material. The thickness of the positive electrode active material layer may be selected from the range of 10 to 100 µm, for example.

(Positive Electrode Active Material)

The positive electrode active material is preferably a lithium transition metal oxide. Exemplary transition metal elements include Sc, Y, Mn, Fe, Co, Ni, Cu, and Cr. Among these elements, Mn, Co, Ni, and the like are preferable. Such an oxide is $LiCoO_2$ when the transition metal is Co alone. The lithium transition metal oxide is more preferably lithium nickel complex oxide, which contains Li, Ni, and other metals.

Examples of the lithium nickel complex oxide include $Li_aNi_bM_{1-b}O_2$ (M is at least one selected from the group consisting of Mn, Co, and Al; $0<a\leq 1.2$; $0.3\leq b\leq 1$). From a viewpoint of increasing the capacity, it is more preferable to satisfy $0.8\leq b\leq 1$. Meanwhile, in view of stable crystal structure, $Li_aNi_bCo_cAl_dO_2$ containing Co and Al as M ($0<a\leq 1.2$, $0.8\leq b<1$, $0<c<0.2$, $0<d\leq 0.1$, $b+c+d=1$) is further preferable.

Specific examples of the lithium nickel complex oxide include lithium nickel cobalt manganese complex oxide ($LiNi_{0.5}Co_{0.2}Mn_{0.3}O_2$, $LiNi_{1/3}Co_{1/3}Mn_{1/3}O_2$, and $LiNi_{0.4}Co_{0.2}Mn_{0.4}O_2$, for example), lithium nickel manganese complex oxide ($LiNi_{0.5}Mn_{0.5}O_2$ and $LiNi_{0.5}Mn_{1.5}O_4$, for example), lithium nickel cobalt complex oxide ($LiNi_{0.8}Co_{0.2}O_2$, for example), and lithium nickel cobalt aluminum complex oxide ($LiNi_{0.8}Co_{0.15}Al_{0.05}O_2$, $LiNi_{0.8}Co_{0.18}Al_{0.02}O_2$, $LiNi_{0.88}Co_{0.09}Al_{0.03}O_2$).

(Negative Electrode)

The negative electrode includes a sheet-like negative electrode current collector and a negative electrode active material layer provided on the surface of the negative electrode current collector. The negative electrode active material layer may be formed on either surface of the negative electrode current collector or may be formed on both the surfaces.

(Negative Electrode Current Collector)

Examples of the negative electrode current collector include metal foils, metal sheets, meshes, punching sheets, and expanded metals. As a material for the negative electrode current collector, stainless steel, nickel, copper, a copper alloy, aluminum, an aluminum alloy, or the like may be used. The thickness of the negative electrode current collector may be selected from the range of 3 to 50 μm, for example.

(Negative Electrode Active Material Layer)

The negative electrode active material layer can be formed using a negative electrode slurry containing a negative electrode active material, a binder, and a dispersion medium by a method in accordance with the production of a positive electrode active material layer. The negative electrode active material layer may further contain optional components, such as a conductive agent, as necessary. The amount of binder contained in the negative electrode active material layer is preferably 0.1% by mass or more and more preferably 1% by mass or more relative to 100% by mass of the negative electrode active material. Meanwhile, the amount of binder contained in the negative electrode active material layer is preferably 20% by mass or less and more preferably 5% by mass or less relative to 100% by mass of the negative electrode active material. The thickness of the negative electrode active material layer may be selected from the range of 10 to 100 μm, for example.

(Negative Electrode Active Material)

The negative electrode active material may be a non-carbonaceous material, a carbon material, or a combination thereof. As the non-carbonaceous material used as the negative electrode active material, lithium-containing metal oxides of titanium, tantalum, niobium, or the like as well as alloying materials are preferable. The alloying materials preferably contain silicon or tin, and elemental silicon and silicon compounds are particularly preferable. The silicon compounds encompass silicon oxide and silicon alloys. Meanwhile, the carbon material used as the negative electrode active material is not particularly limited but is preferably at least one selected from the group consisting of graphite and hard carbon, for example. In particular, graphite is promising due to the high capacity as well as the small irreversible capacity. In addition, graphite is highly active in reductive decomposition of a nonaqueous electrolyte and thus exhibits remarkable effects by covering the surface of the negative electrode active material layer with a second coating.

The term "graphite" is a generic term for carbon materials having the graphite structure and encompasses natural graphite, synthetic graphite, expanded graphite, graphitized mesophase carbon particles, and the like.

(Separator)

As the separator, a microporous film, a nonwoven fabric, a woven fabric, or the like that contains a material selected from resins, glass, ceramics, and so forth is used. As the resins, for example, polyolefins, such as polyethylene and polypropylene; polyamides; and polyamide-imides are used. As the glass and ceramics, for example, borosilicate glass, silica, alumina, and titania are used.

EXAMPLES

Hereinafter, an Example and a Comparative Example of the present disclosure will be described specifically. However, the present disclosure is by no means limited to the following Example.

Example 1

According to the following procedure, an aqueous rechargeable battery was produced.

(1) Preparation of Aqueous Electrolyte Solution

An aqueous electrolyte solution was obtained by mixing $LiN(SO_2CF_3)_2$ (CAS registry number: 90076-65-6), $LiN(SO_2C_2F_5)_2$ (CAS registry number 132843-44-8), and ultra-pure water (CAS registry number: 7732-18-5) in a molar ratio of 0.7:0.3:2. The obtained aqueous electrolyte solution was added with 1% by mass of $LiPF_2O_2$ relative to 100% by mass of the electrolyte solution. In the analysis of the resulting aqueous electrolyte solution, $LiPF_2O_2$ as a main component, a trace amount of $Li_2PFO_3$, and a trace amount of $Li_3PO_4$ were detected. The weight % of water in the resulting electrolyte solution was about 10% by weight. Further, the mole number of water in the electrolyte solution was 2 mol relative to 1 mol of the Li salts.

(2) Production of Positive Electrode

A positive electrode slurry was prepared by mixing lithium cobalt oxide ($LiCoO_2$), acetylene black (AB) as a conductive agent, and polyvinylidene fluoride (PVdF) as a binder in a mass ratio of 94:3:3, further adding an appropriate amount of N-methyl-2-pyrrolidone (NMP), and stirring. The obtained positive electrode slurry was applied to one surface of a titanium foil (positive electrode current collector) and then dried, and the resulting coating of the positive electrode mixture was rolled with a roller. The obtained stacked structure of the positive electrode current collector and the positive electrode mixture was cut into a disk of 15 mm in diameter to produce a positive electrode having a positive electrode active material layer on one surface of the positive electrode current collector.

(3) Production of Negative Electrode

A negative electrode slurry was prepared by mixing lithium titanate particles (average particle size (D50) of 7 μm) as a negative electrode active material, AB as a conductive agent, and PVdF as a binder in a mass ratio of 85:5:10, further adding an appropriate amount of N-methyl-2-pyrrolidone (NMP), and stirring. The obtained negative electrode slurry was applied to one surface of a 20 μm-thick aluminum foil (negative electrode current collector) and then dried, and the resulting coating of the negative electrode mixture was rolled with a roller. The obtained stacked structure of the negative electrode current collector and the negative electrode mixture was cut into a disk of 16 mm in diameter to produce a negative electrode having a negative electrode active material layer on one surface of the negative electrode current collector.

(4) Production of Battery

The positive electrode, the negative electrode, the aqueous electrolyte solution obtained as described above, and a 0.42 mm-thick glass nonwoven fabric separator were placed within a coin cell case. A coin-type aqueous rechargeable battery A1 was obtained by fixing a gasket to the periphery of the coin cell case, placing a seal, and swaging the periphery for sealing. The coin cell was assembled inside a glovebox in an argon atmosphere.

Comparative Example 1

An aqueous electrolyte solution was prepared in the same manner as Example 1 except for omitting addition of $LiPF_2O_2$ to the aqueous electrolyte solution. An aqueous rechargeable battery B1 was produced by using the prepared electrolyte solution.

[Evaluation 1: Measurement of Initial Coulombic Efficiency]

<Charging>

Each battery was charged at a constant current of 0.2 C (0.36 mA) to a voltage of 2.75 V.

<Discharging>

Each battery was discharged at a constant current of 0.2 C (0.36 mA) to a voltage of 1.75 V.

The rest period between charging and discharging was set to 0 min. For each battery, a ratio of the discharge capacity to the charge capacity in the first cycle under the above-mentioned charge/discharge conditions was calculated as an initial coulombic efficiency. The calculated initial coulombic efficiency is shown in Table 1.

[Evaluation 2: Measurement of Self-Discharge Rate]

Each battery was charged at a constant current of 0.2 C to a closed-circuit voltage of 2.75 V and stored at 25° C. for 7 days to determine a change rate in open-circuit voltage (mV/Hour). The storage test after charging was conducted in an environment of 25° C. The change rate in open-circuit voltage (mV/Hour) is shown in Table 1 as a self-discharge rate.

The evaluation results of Example 1 and Comparative Example 1 are shown in Table 1.

TABLE 1

| Cell | Amount of $LiPF_2O_2$ added (% by mass) | Initial coulombic efficiency [%] | Self-discharge rate [mV/Hour] |
| --- | --- | --- | --- |
| A1 | 1 | 72.7 | −0.81 |
| B1 | 0 | 69.7 | −2.69 |

As shown in Table 1, the aqueous rechargeable battery A1 of Example 1 has, by addition of $LiPF_2O_2$ to the electrolyte solution, an improved initial coulombic efficiency compared with the aqueous rechargeable battery B1 of Comparative Example 1. Moreover, the battery A1 also exhibits an improved self-discharge rate and suppressed lowering in voltage during storage after charging.

Here, $Li_2PF_2O_2$ was added to the aqueous electrolyte solution in Example 1. However, it is possible to improve the initial coulombic efficiency and self-discharge rate of a rechargeable battery in the same manner as Example 1 through addition of any lithium fluorophosphate to the aqueous electrolyte solution.

INDUSTRIAL APPLICABILITY

The rechargeable battery according to the present disclosure is useful as a rechargeable battery used for, for example, a power supply for driving personal computers, cellphones, mobile devices, personal digital assistants (PDAs), handheld game consoles, video cameras, and so forth; for a main power supply or an auxiliary power supply for driving electric motors of hybrid electric vehicles, fuel cell vehicles, plug-in HEVs, and so forth; and for a power supply for driving power tools, vacuum cleaners, robots, and so forth.

REFERENCE SIGNS LIST

1 Coin cell
10 Positive electrode
11 Positive electrode active material layer
12 Positive electrode current collector
20 Negative electrode
21 Negative electrode active material layer
22 Negative electrode current collector
30 Separator
31 Electrolyte solution
50 Coin cell case
51 Seal
52 Gasket

The invention claimed is:

1. A rechargeable battery comprising a positive electrode, a negative electrode, and an electrolyte solution, wherein:
the electrolyte solution contains water and one or more lithium salts;
the lithium salts include lithium fluorophosphate; and
the electrolyte solution contains 8% by mass or more and 50% by mass or less of water.

2. The rechargeable battery according to claim 1, wherein the lithium fluorophosphate is $Li_xPF_yO_z$ ($1 \le x < 3$, $0 < y \le 2$, $2 \le z < 4$).

3. The rechargeable battery according to claim 1, wherein the lithium fluorophosphate includes at least either one of $LiPF_2O_2$ and $Li_2PFO_3$.

4. The rechargeable battery according to claim 1, wherein the lithium salts further include a salt formed from a lithium ion and an imide anion.

5. The rechargeable battery according to claim 1, wherein the electrolyte solution contains 0.1% by mass or more and 5.0% by mass or less of the lithium fluorophosphate.

6. The rechargeable battery according to claim 1, wherein the electrolyte solution contains 4 mol or less of water relative to 1 mol of the lithium salts.

7. The rechargeable battery according to claim 1, wherein the electrolyte solution further contains $Li_3PO_4$.

8. The rechargeable battery according to claim 1, wherein the electrolyte solution further contains a carboxylic anhydride.

* * * * *